(12) United States Patent
Obama et al.

(10) Patent No.: US 7,012,424 B2
(45) Date of Patent: Mar. 14, 2006

(54) MAGNETIC MATERIAL DETECTING APPARATUS

(75) Inventors: Masao Obama, Yokosuka (JP); Seiichi Hashiya, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 64 days.

(21) Appl. No.: 11/062,452

(22) Filed: Feb. 22, 2005

(65) Prior Publication Data
US 2005/0189939 A1    Sep. 1, 2005

(30) Foreign Application Priority Data
Feb. 27, 2004    (JP)    ............................. 2004-054911

(51) Int. Cl.
*G01N 27/72*    (2006.01)
*G01R 33/12*    (2006.01)
(52) U.S. Cl. ..................................... 324/232
(58) Field of Classification Search ................ 324/214, 324/228–230, 232–244, 258, 260
See application file for complete search history.

(56) References Cited

FOREIGN PATENT DOCUMENTS

JP    09-236642    9/1997
JP    2002-042203    2/2002

*Primary Examiner*—Bot LeDynh

(57) ABSTRACT

A pair of cores is arranged so that their respective first end portions are opposed to each other across a given gap with a transfer path (M) for the passage of a medium between them. Coils wound individually on the respective first end portions of the cores are connected in series with each other to form a first coil. Coils 5a and 5b wound individually on second end portions of the cores are connected in series with each other to form a second coil. Coils wound individually on respective intermediate portions of the cores are connected in series with each other to form a third coil. A signal processing circuit is provided for AC-energizing the third coil to process a detection signal from the first coil and a detection signal from the second coil.

13 Claims, 13 Drawing Sheets

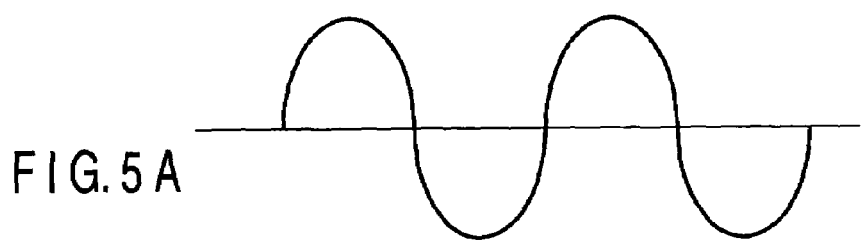
FIG.5A
FIG.5B  φ=0
FIG.5C  V01
FIG.5D  φ=-90
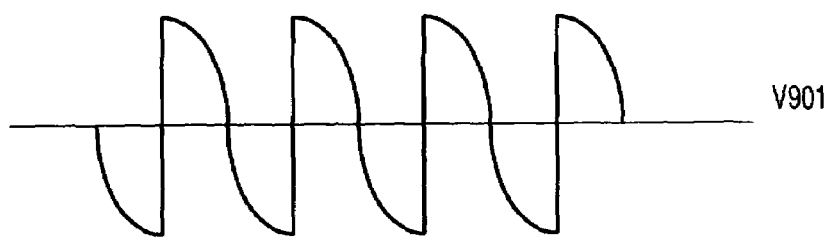
FIG.5E  V901

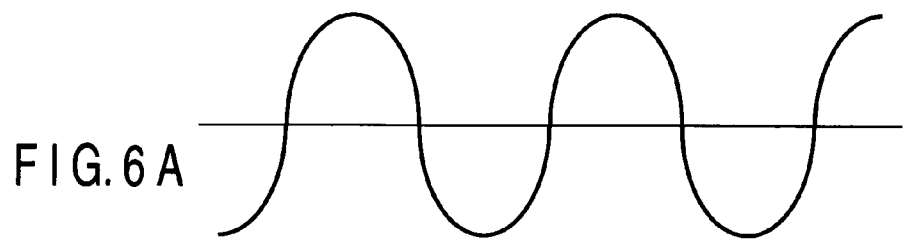
FIG. 6A
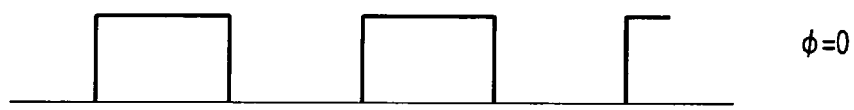
FIG. 6B   φ=0
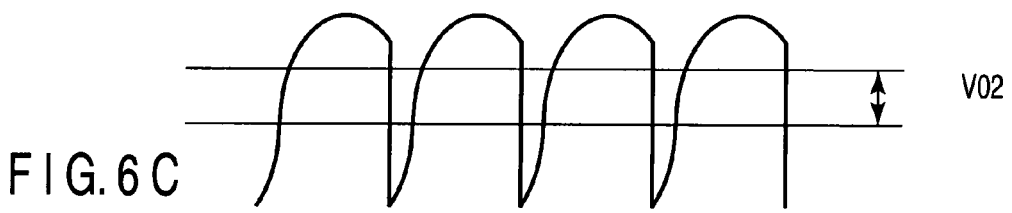
FIG. 6C   V02
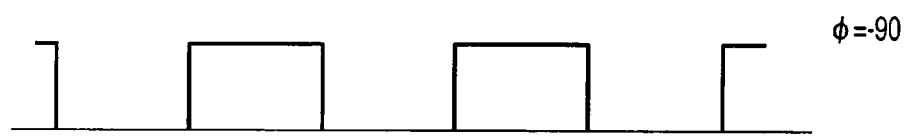
FIG. 6D   φ=-90
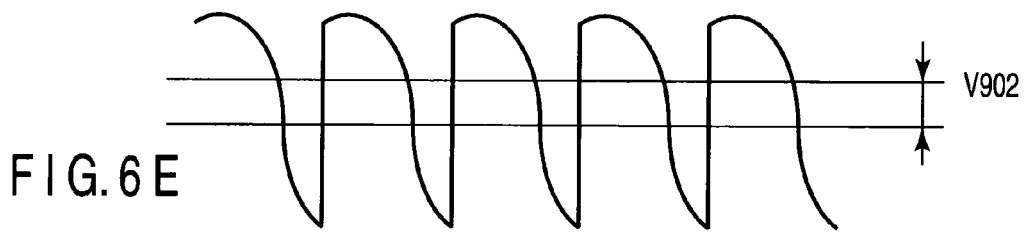
FIG. 6E   V902

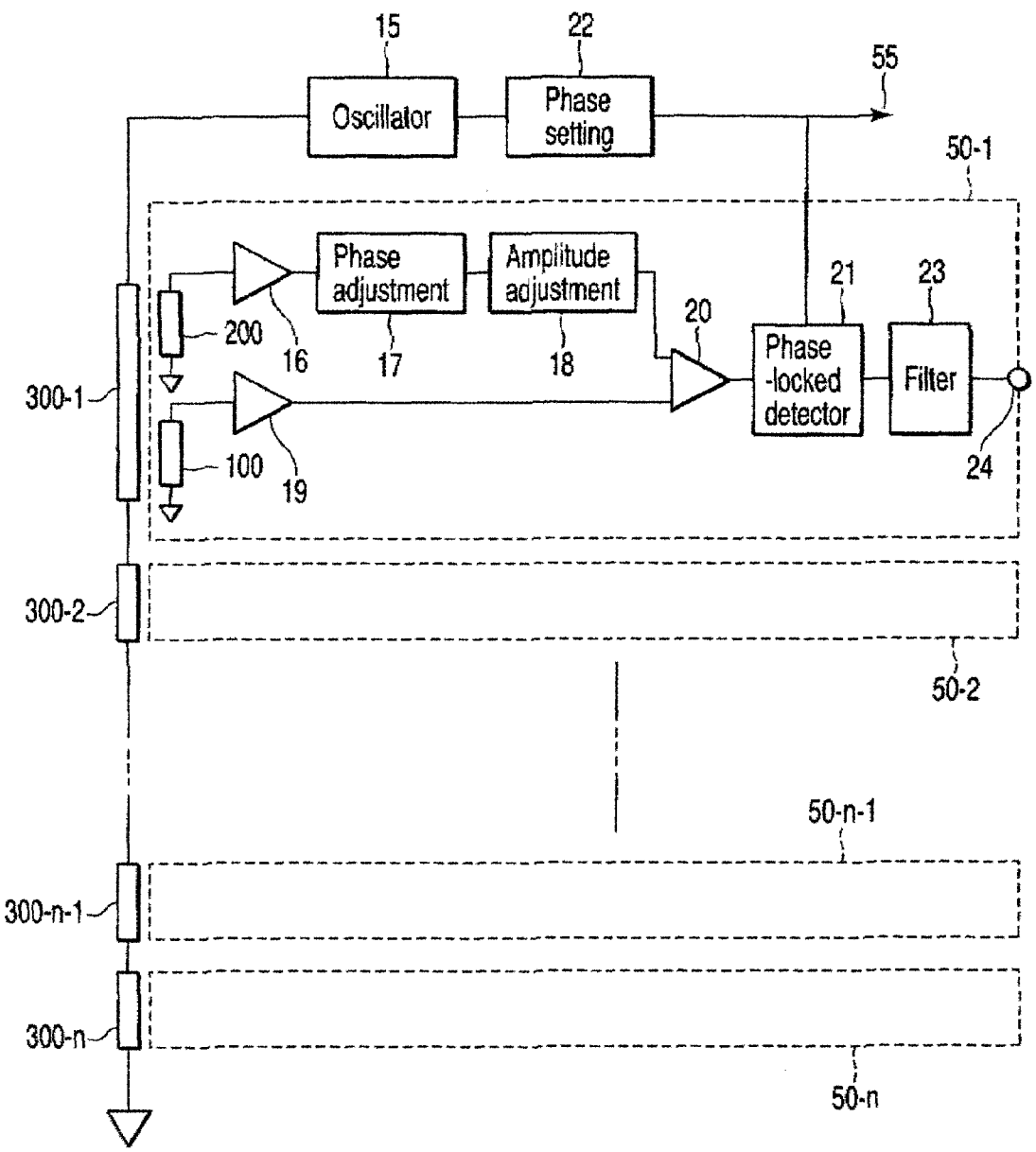
F I G. 10

MAGNETIC MATERIAL DETECTING APPARATUS

CROSS-REFERENCE TO RELATED APPLICATIONS

This application is based upon and claims the benefit of priority from prior Japanese Patent Application No. 2004-054911, filed Feb. 27, 2004, the entire contents of which are incorporated herein by reference.

BACKGROUND OF THE INVENTION

1. Field of the Invention

This invention relates to a magnetic material detecting apparatus for detecting in a non-contact manner a small amount of magnetic material contained in, e.g., printing ink that is used to print media to be detected, such as paper sheets.

2. Description of the Related Art

Methods are generally known in which paper sheets are identified by detecting a magnetic material contained in printing ink that is used to print the sheets. These conventional methods are based on a differential-coil transformer system, in which a difference between induced voltages produced in two secondary coils is outputted, or a system in which a change of induced voltage of an annular core is detected.

According to the former system, a primary coil that is wound on the central portion of an S-shaped core is used in combination with the two secondary coils that are wound on the sides of two finely spaced openings, individually. A paper sheet is passed through the region above one of the openings, and the difference between the induced voltages in the two secondary coils is outputted.

According to the latter system, a coil is wound on the annular core, which is provided with a fine partial gap. The change of the induced voltage in the annular core is detected as the sheet passes through the region above the fine partial gap of the core.

A magnetic material detecting apparatus described in Jpn. Pat. Appln. KOKAI Publication No. 2002-42203 comprises a pair of I-shaped cores that are wound with coils on their respective longitudinally opposite end portions. These cores are arranged so that their respective one ends face each other with a gap between them. The coils on the facing-side end portions of the paired cores are connected in series with each other, and so are the coils on the opposite end portions of the cores. Thus, two coil pairs are formed. A magnetic material that passes between the cores is detected by detecting the difference between impedance of the coils.

According to the magnetic material detecting apparatus described in Jpn. Pat. Appln. KOKAI Publication No. 2002-42203, a detection signal fluctuates little if the distance between the cores and the magnetic material varies, and the obtained detection signal is proportional to the amount of the magnetic material. Thus, stable magnetic material detection can be enjoyed.

In the magnetic material detecting apparatus constructed in this manner, however, the paired cores are opposed to each other, the coils are wound individually as a detection coil and a dummy coil on each core, and the change of the impedance of the coils is detected with bridge circuits. In detecting the distribution of the magnetic material in a wide range of the paper sheet with a plurality of pairs of cores arranged side by side, therefore, the bridge circuits are formed individually for the core pairs and energized, and the balance is adjusted so that bridge outputs are minimized. If the core pairs are set close to one another, therefore, interference is caused between the adjacent core pairs, so that it is hard to detect accurate magnetic material signals. In consequence, there are restrictions on minimum spaces between the adjacent core pairs, so that the detection accuracy cannot be improved with ease.

BRIEF SUMMARY OF THE INVENTION

The object of this invention is to provide a magnetic material detecting apparatus free from interference between adjacent cores despite their close arrangement and capable of accurately detecting a magnetic material distribution.

In order to achieve the above object, a magnetic material detecting apparatus according to an aspect of the invention comprises: a pair of cores, each of which has a first end portion, a second end portion opposite to the first end portion, and an intermediate portion between the first and second end portions, the respective first end portions of the cores being opposed to each other across a gap with a transfer path for the passage of a medium to be detected therebetween; a first coil including coils which are wound individually on the respective first end portions of the cores and connected in series with each other; a second coil including coils which are wound individually on the respective second end portions of the cores and connected in series with each other; a third coil including coils which are wound individually on the respective intermediate portions of the cores and connected in series with each other; and a signal processing circuit which AC-energizes the third coil to process a detection signal from the first coil and a detection signal from the second coil.

According to an aspect of the invention, there may be provided a magnetic material detecting apparatus free from interference between adjacent cores despite their close arrangement and capable of accurately detecting a magnetic material distribution.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 5A to 5E are diagrams individually showing signal waveforms of the signal processing circuit shown in FIG. 4;

FIGS. 6A to 6E are diagrams individually showing signal waveforms of the signal processing circuit shown in FIG. 4;

FIG. 10 is a block diagram schematically showing a signal processing circuit of a magnetic material detecting apparatus according to a third embodiment of the invention;

DETAILED DESCRIPTION OF THE INVENTION

Magnetic material detecting apparatuses according to embodiments of this invention will now be described in detail with reference to the accompanying drawings.

Figure 1:
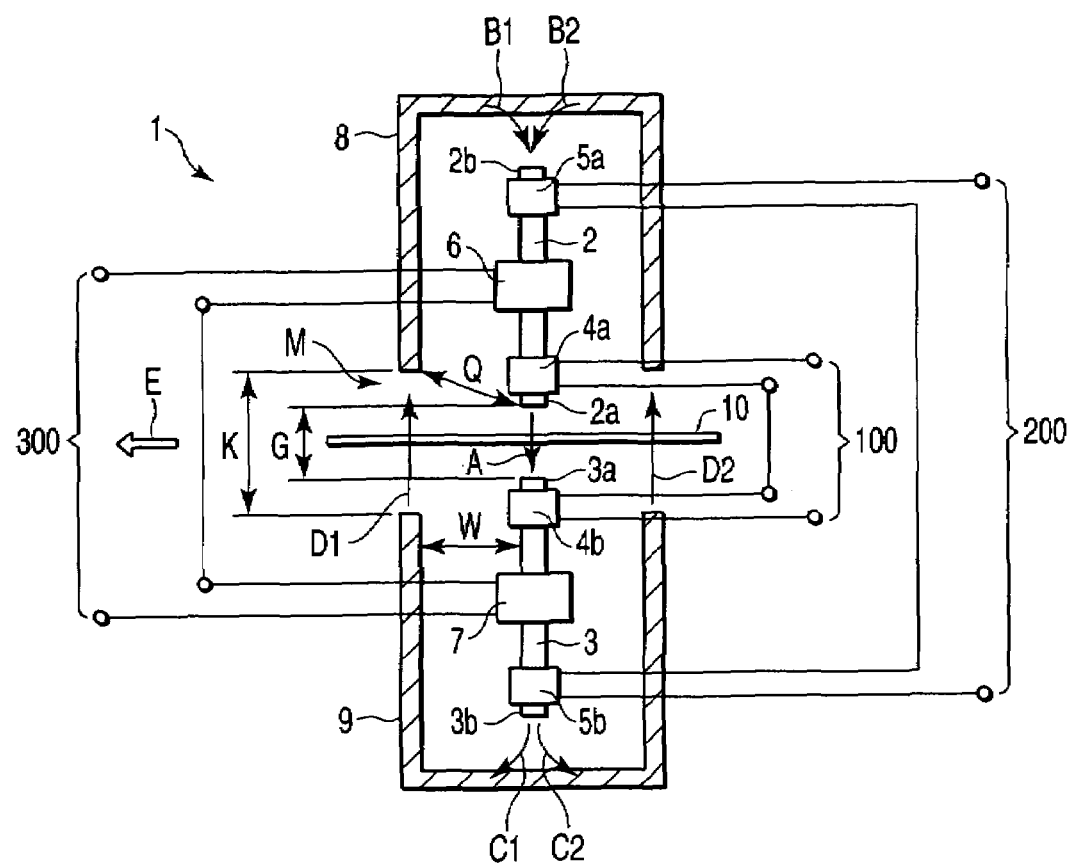
FIG. 1 is a sectional view schematically showing a magnetic material detecting apparatus according to a first embodiment of the invention.
Figure 2:
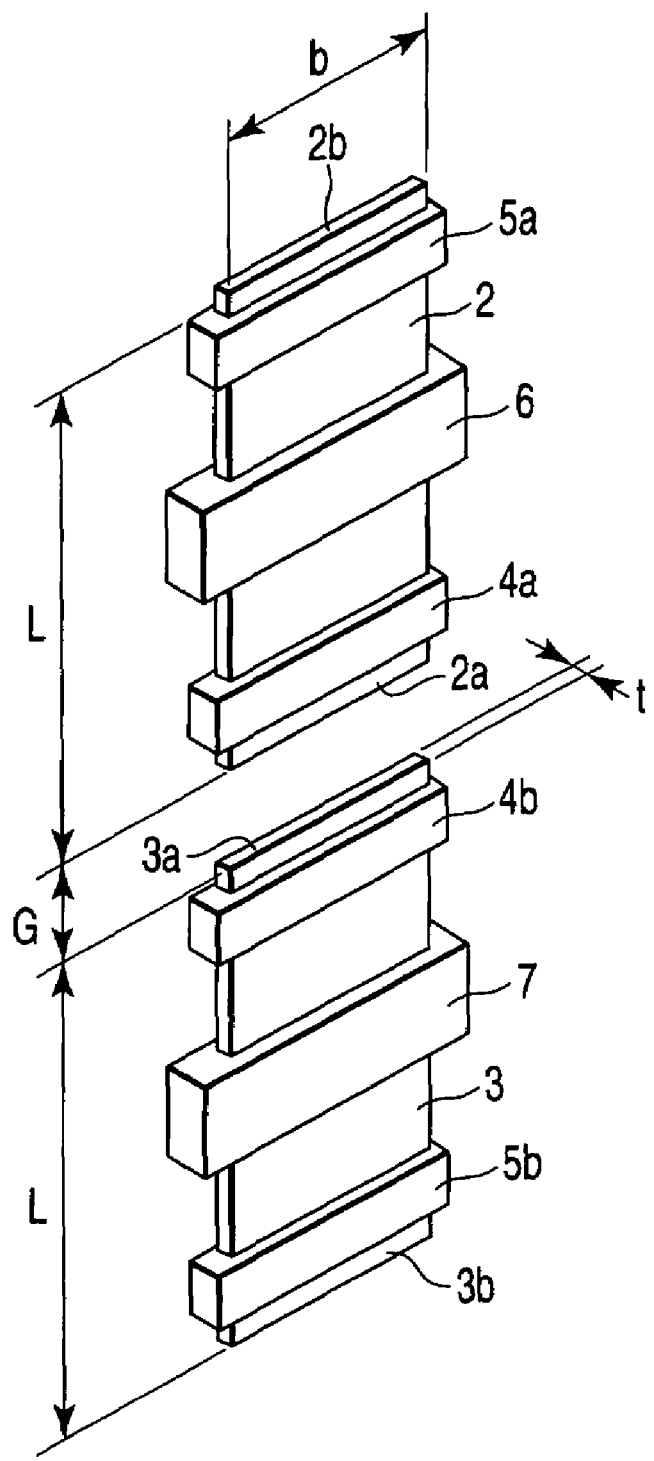
FIG. 2 is a perspective view showing an external shape of cores constituting a sensing element of the magnetic material detecting apparatus.

As shown in FIGS. 1 and 2, a magnetic material detecting apparatus according to a first embodiment of the invention is configured to detect in a non-contact manner a small amount of magnetic material contained in printing ink that is used to print paper sheets, such as printed matters. The magnetic material detecting apparatus comprises a sensing element 1, which includes a pair of cores 2 and 3, coils 4a and 4b, coils 5a and 5b, and magnetic covers 8 and 9. A paper sheet 10 as a medium to be detected is conveyed in a movement direction E along a transfer path M by a conveyor mechanism (not shown). The sheet 10 may be a printed matter or a security printed with printing ink that contains magnetic powder, for example.

Each of the cores 2 and 3 is formed by laminating amorphous foils of a soft magnetic material together and has the shape of a rectangular plate with a length L, width b, and thickness t. The core 2 has a first end portion 2a, a second end portion 2b on the opposite side from the first end portion, and an intermediate portion between the first and second end portions. The core 3 has a first end portion 3a, a second end portion 3b on the opposite side from the first end portion, and an intermediate portion between the first and second end portions.

The cores 2 and 3 are located in a manner such that their respective first end portions 2a and 3a are opposed to each other with the transfer path M between them, that is, across a gap G through which the sheet 10 passes. The cores 2 and 3 are arranged in a direction perpendicular to the surface of the sheet 10 or in a vertical direction in this case. At the same time, the cores 2 and 3 are arranged so that their width direction b is perpendicular to the movement direction E of the sheet 10 and parallel to the surface of the sheet. Thus, the paired cores 2 and 3 are aligned with each other in parallel relation.

The coils 4a and 4b are wound on the first end portions 2a and 3a of the cores 2 and 3, respectively, and the coils 5a and 5b on the second end portions 2b and 3b, respectively. Coils 6 and 7 are wound on the longitudinally intermediate portions of the cores 2 and 3, respectively. The coils 4a and 4b on the first end portions 2a and 3a are connected in series with each other to form a first coil 100. The coils 5a and 5b on the second end portions 2b and 3b are connected in series with each other to form a second coil 200. The coils 6 and 7 on the intermediate portions are connected in series with each other to form a third coil 300.

The magnetic covers 8 and 9 are formed of a magnetic material and surround at least open-side end portions of their corresponding cores 2 and 3, coils 5a and 5b, and coils 6 and 7. Thus, the covers 8 and 9 prevent influences of external magnetic flux.

When the third coil 300 is energized, an annular magnetic path for magnetic flux is formed by a magnetic path that extends along a arrow A, core 3, arrow C1, magnetic cover 9, arrow D1, magnetic cover 8, arrow B1, and core 2 and a magnetic path that extends along the arrow A, core 3, arrow C2, magnetic cover 9, arrow D2, magnetic cover 8, arrow B2, and core 2. As the magnetic flux pass through the cores 2 and 3, induced voltages are produced in the first and second coils 100 and 200.

When the sheet 10 printed with magnetic ink is inserted into the gap G between the cores 2 and 3, the distribution of the magnetic flux in the gap G changes, so that the induced voltages in the first and second coils 100 and 200 change. However, a gap between the magnetic paths of the magnetic force lines D1 and D2 is wider than the gap G between the cores 2 and 3, so that there is a substantial leakage of magnetic flux. Therefore, the magnetic force lines D1 and D2 in the annular magnetic path are reduced, the magnetic force lines are changed little by the sheet 10, and the induced voltage of the second coil 200 is also changed little. That portion of the magnetic powder in the magnetic ink on the sheet 10 which is located in the gap G between the first end portions 2a and 3a of the cores 2 and 3 is detected by the first coil 100.

When the sheet 10 moves in the direction of an arrow E, the magnetic ink that is distributed along this movement direction E is detected as a change of the induced voltage of the first coil 100 that is caused as the amount of the magnetic ink in the gap G changes.

If the ambient temperature of the sensing element 1 changes, on the other hand, the permeabilities of the cores 2 and 3 vary, so that the induced voltages of the first and second coils 100 and 200 change. Since the respective ambient temperatures of the coils 100 and 200 are substantially equal, the induced voltages are changed in like manner by the temperature change. If the difference between the induced voltages of the first and second coils 100 and 200 is obtained, therefore, temperature-induced variations of the induced voltages are canceled, and only variations of the induced voltages that are caused by the magnetic material can be taken out.

The following is a description of an influence of position variation of the sheet 10 in the gap G between the cores 2 and 3. When the sheet 10 is located halfway in the gap G, the variations of the induced voltages of the coils 4a and 4b are equal. When the sheet 10 approaches the first end portion 2a of the core 2, the induced voltage of the coil 4a increases, while that of the coil 4b decreases. Since the coils 4a and 4b of the first coil 100 are connected in series with each other, however, the increments and decrements of the induced voltages of the two coils 4a and 4b cancel one another. In consequence, the variations of the induced voltages that are attributable to the position variation are reduced. Even if the sheet 10 swings in the gap G between the opposed portions 2a and 3a of the cores 2 and 3, therefore, it influences detection signals little.

The above is a description of the configuration and operation of the sensing element 1. The same effects of the foregoing embodiment can be maintained if the directions of the magnetic force lines A, D1, D2, B1, B2, C1 and C2 are reversed or if the directions of the lines B1 and B2 and/or the lines C1 and C2 are opposite to the directions of the lines A, D1 and D2.

The cores 2 and 3 may be formed of any other magnetic material than amorphous foils. With use of high-permeability materials such as the amorphous foils, however, the spread of the magnetic force lines can be reduced, so that the gap G between the opposed core portions 2a and 3a can be widened.

Preferably, in order to avoid lowering the detection sensitivity of the magnetic material in the gap G between the opposed core portions 2a and 3a, a space W between the cores 2 and 3 and the covers 8 and 9, a space Q between the first end portions 2a and 3a of the cores 2 and 3 and end portions of the covers 8 and 9, and a space k between the respective end portions of the covers 8 and 9 are adjusted to be larger than the gap G.

As shown in FIG. 2, the width (longitudinal width) b of the cores 2 and 3 is set to be twice as large as the thickness t or larger. Thus, the cores 2 and 3 are given a certain width in the direction perpendicular to the movement direction E and their thickness t is reduced so that the thickness of the magnetic force lines is small. By doing this, a change of the movement-direction distribution of the magnetic material can be detected accurately.

The coils 4a and 4b are wound in positions near the first end portions 2a and 3a of the cores, respectively. Thus, variations of the magnetic force lines in the gap G between the first end portions 2a and 3a can be detected with high sensitivity. The influence of the second end portions 2b and 3b can favorably be reduced if the space between the first end portions 2a and 3a and the second end portions 2b and 3b, that is, the length L of the cores 2 and 3, is made greater than the gap G.

Figure 3:
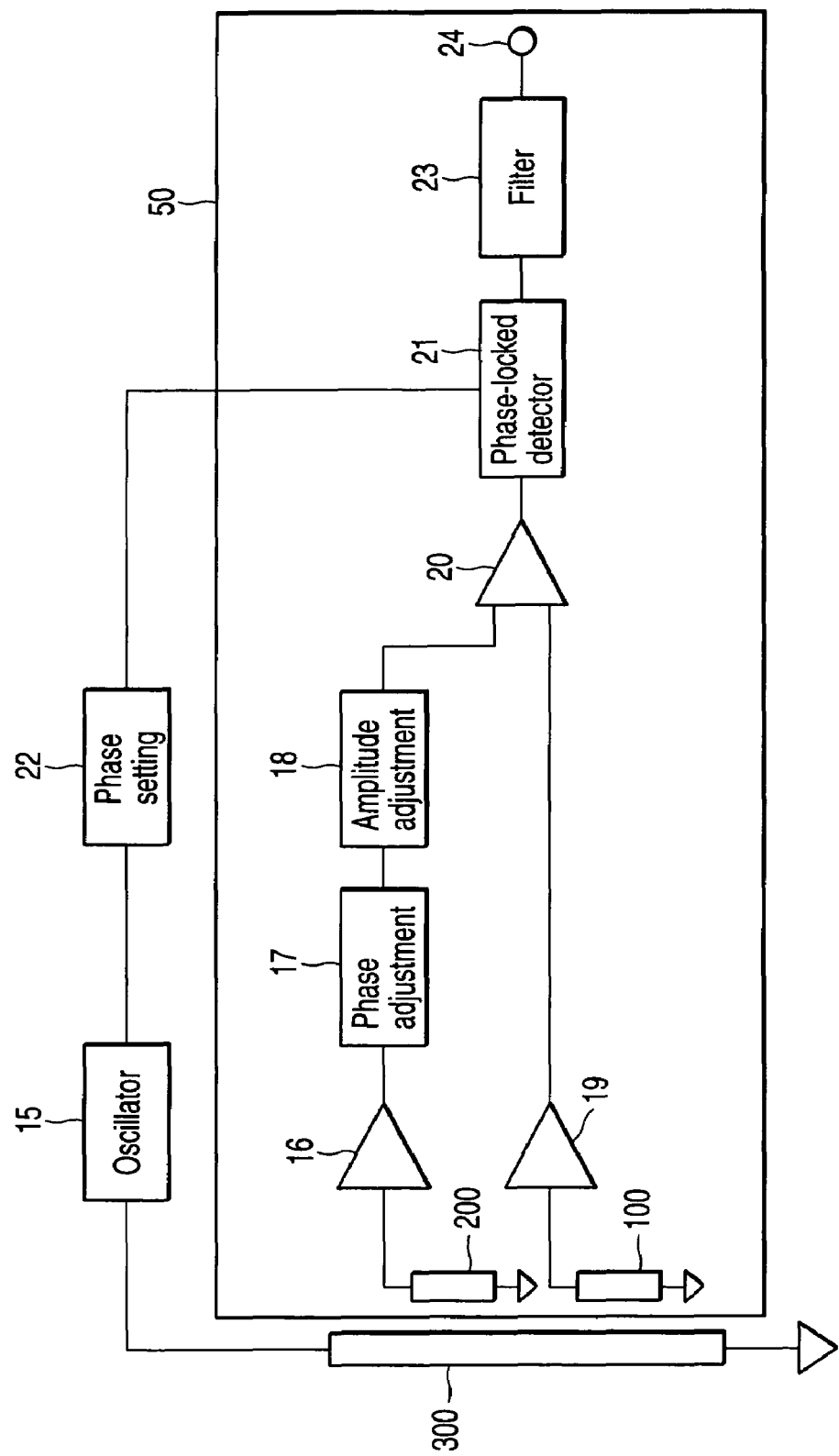
FIG. 3 is a block diagram schematically showing a signal processing circuit of the sensing element.

The magnetic material detecting apparatus comprises a signal processing circuit for processing signals from the sensing element 1. As shown in FIG. 3, the signal processing circuit is provided with an oscillator circuit 15 that generates a signal for energizing the third coil 300. This oscillator circuit is connected to a phase-sensitive detecting circuit 21 through a phase setting circuit 22, which serves as a second adjusting unit. The second coil 200 is connected to one input terminal of a differential amplifier 20 through a phase adjustment circuit 17 and an amplitude adjustment circuit 18, which serve as a first adjusting unit, and an amplifier 16. The first coil 100 is connected to the other input terminal of the differential amplifier 20 through an amplifier 19. An output terminal of the differential amplifier 20 is connected to a circuit output 24 through the phase-sensitive detecting circuit 21 and a low-pass filter circuit 23.

If the third coil 300 is AC-energized by the oscillator circuit 15, induced voltages are produced in the first and second coils 100 and 200 through the cores 2 and 3. The following adjustment is carried out without the sheet 10 or the like in the gap G between the first end portions 2a and 3a of the cores.

First, a detection signal from the first coil 100 is amplified by the amplifier 19 and applied to the one input terminal of the differential amplifier 20. After a detection signal from the second coil 200 is amplified by the amplifier 16, it is aligned in phase with the output signal of the amplifier 19 or the amplified signal of the first coil 100 by the phase adjustment circuit 17. Further, the phase-aligned signal is adjusted in amplitude to the output signal of the amplifier 19 in the amplitude adjustment circuit 18 and applied the other input terminal of the differential amplifier 20. Since the input signals at the two input terminals are of the same phase and same amplitude, the output signal of the differential amplifier 20 is approximately zero.

In the magnetic ink or other magnetic material is fed into the gap G between the first end portions 2a and 3a of the cores 2 and 3 after the adjustment described above, the induced voltage of the first coil 100 increases. Accordingly, the output signal of the differential amplifier 20 changes, whereupon an AC waveform is outputted. The phase-sensitive detecting circuit 21, which serves as a smoothing unit, detects and rectifies the output signal of the differential amplifier 20 in a phase set by the phase setting circuit 22.

The phase setting circuit 22 feeds the phase-sensitive detecting circuit 21 with a signal that is shifted for the set phase with respect to an input waveform of the oscillator circuit 15. For the set phase, the phase of an energized AC signal is set so that the output signal of the phase-sensitive detecting circuit 21 has its maximum value with respect to a signal based on the magnetic material when the medium to be detected is placed in the sensing element 1, for example. In this phase setting, a noise component signal that is harmful to the detection signals may be minimized. The filter circuit 23 smoothes the detected AC signal, which is detected and rectified by the phase-sensitive detecting circuit 21, to a DC signal. The filter circuit 23 may be given a function to change the voltage level of the output signal.

According to the magnetic material detecting apparatus constructed in this manner, the respective first end portions of the two cores are opposed to each other, and the coils that are provided individually on the second end portions on the opposite side from the opposed portions are connected in series with each other. Therefore, variations of the induced voltage values of the coils that depend on the position of the magnetic material in the gap G are so small that they can be detected in a non-contact manner. While the gap portion that is defined between the end portions of the core outputs a detection signal in response to the magnetic material, the opposite end portions of the cores are so distant from the magnetic material that they hardly respond to it. Accordingly, the temperature-induced variations are canceled by the difference between the respective induced voltages of the first and second coils 100 and 200, so that a signal proportional to the amount of the magnetic material can be obtained. Since the cores 2 and 3 have a simple shape, moreover, they can be easily manufactured and incorporated in the detecting apparatus, so that the manufacturing cost can be lowered.

Figure 4:
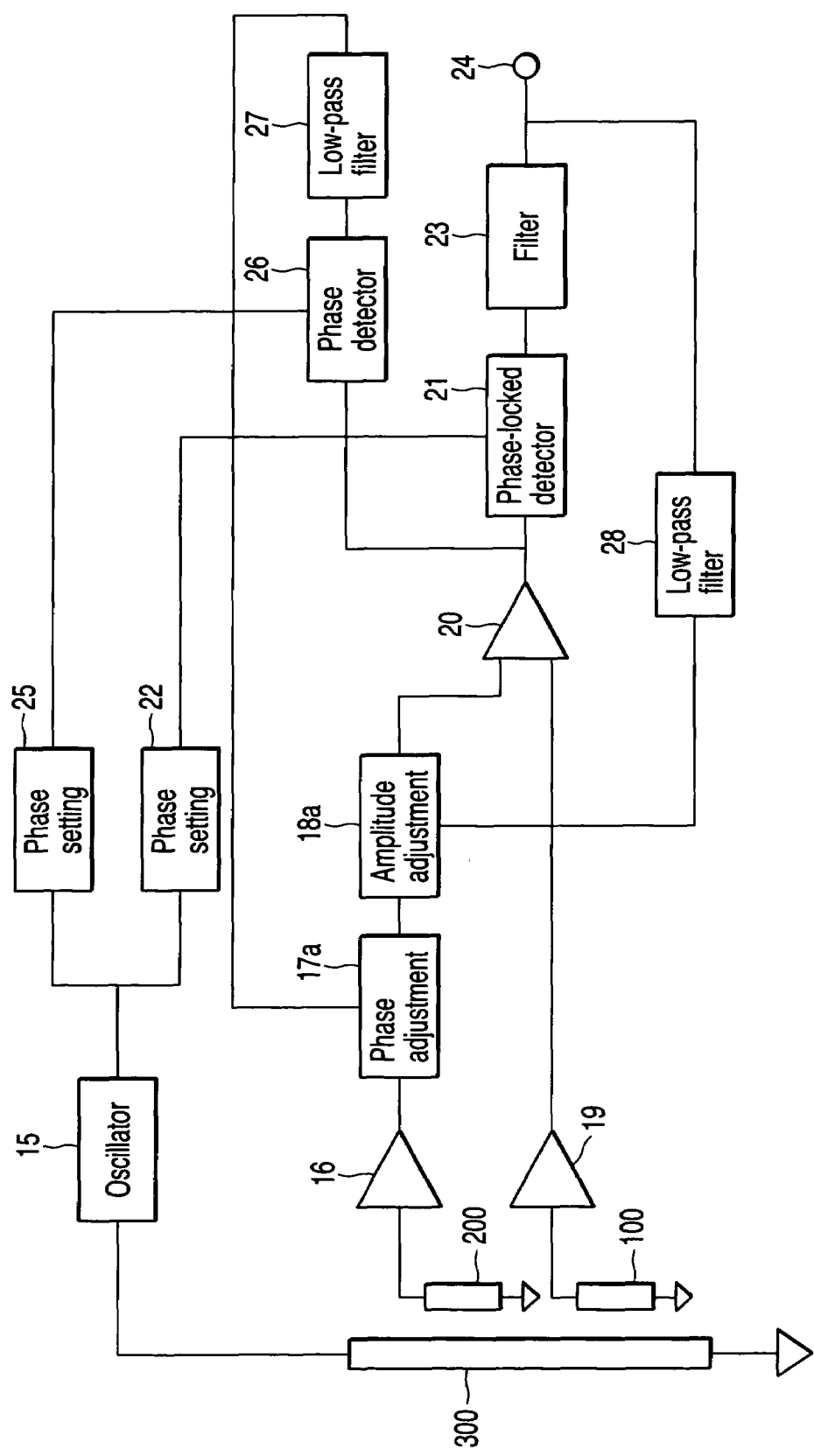
FIG. 4 is a block diagram schematically showing another embodiment of the signal processing circuit of the sensing element.

A signal processing circuit of a sensing element 1 according to another embodiment will now be described with reference to FIG. 4. Like reference numerals are used to designate the same portions as those of the foregoing embodiment, and a detailed description of those portions is omitted. This signal processing circuit is obtained by adding a function block to the aforementioned signal processing circuit.

An amplifier 16 of a second coil 200 is connected to one input terminal of a differential amplifier 20 through a phase adjustment circuit 17a and an amplitude adjustment circuit 18a. The phase adjustment circuit 17a serves to adjust the phase of an input signal with use of a voltage signal as a control signal. It includes a photocoupler-based variable resistor, capacitor, operational amplifier, etc. The amplitude adjustment circuit 18a serves to change the amplification degree of an amplifier with use of a voltage signal as a control input, thereby adjusting the amplitude of an input signal. It includes a photocoupler-based variable resistor, fixed resistor, operational amplifier, etc.

A low-pass filter 28 that is connected between the amplitude adjustment circuit 18a and a circuit output 24 outputs a very low frequency, such as a temperature drift. Another phase setting circuit 25 that is connected to an oscillator circuit 15 in parallel with a phase setting circuit 22 has its phase shifted at 90 degrees to the set phase value of the circuit 22. The phase setting circuit 25 is connected to the output side of the differential amplifier 20 through a phase detecting circuit 26. The detecting circuit 26 detects a signal of minimum sensitivity to the magnetic material from the output signal of the differential amplifier 20.

The phase detecting circuit 26 is connected to the phase adjustment circuit 17a through a low-pass filter 27. The filter 27, like the low-pass filter 28, outputs a very low frequency. A phase detection signal with a phase shifted at 90 degrees to a phase detection signal with maximum sensitivity to the magnetic material is fed back to the phase adjustment circuit 17a and the amplitude adjustment circuit 18a, whereby the output of the differential amplifier 20 is reduced to zero for lower frequencies. Thus, compensation is made to a very low variation of the circuit output 24 caused by a temperature change or the like.

In the signal processing circuit described above, the output of the differential amplifier 20 is supposed to have the waveform shown in FIG. 5A. If this output waveform is based on the detected magnetic material, it has the same phase as the output waveform ($\phi$=0) of the phase setting circuit 22 shown in FIG. 5B. Thus, the output of a phase-sensitive detecting circuit 21 has the waveform shown in FIG. 5C, and the filter circuit 23 has a DC voltage of V01 as its output.

On the other hand, the output waveform of the phase setting circuit 25 shown in FIG. 5D is set by shifting the output waveform of the phase setting circuit 22 shown in FIG. 5B by −90 degrees ($\phi$=−90). Thus, the output of the phase detecting circuit 26 has the waveform shown in FIG. 5E, compared with the output waveform of the differential amplifier 20 shown in FIG. 5A, and an output V901 of the low-pass filter 27 is 0V.

If the output waveform of the differential amplifier 20 shown in FIG. 5A continues to be outputted, the output signal of the filter circuit 23 is fed back through the low-pass filter 28 to the amplitude adjustment circuit 18a at a low response speed. In consequence, the output of the differential amplifier 20 is reduced to zero.

If the phase of the output waveform of the differential amplifier 20 is shifted from the output waveform ($\phi$=0) of the phase setting circuit 22 shown in FIG. 6B, as shown in FIG. 6A, however, the output of the phase-sensitive detecting circuit 21 has the waveform shown in FIG. 6C, and the filter circuit 23 has a DC voltage of V02 (<V01) as its output. The output waveform of the phase setting circuit 25 shown in FIG. 6D is set by shifting the output waveform of the phase setting circuit 22 shown in FIG. 6B by −90 degrees (=−90). Thus, the output of the phase detecting circuit 26 has the waveform shown in FIG. 6E, compared with the output waveform of the differential amplifier 20 shown in FIG. 6A, and the output of the low-pass filter 27 is a DC voltage V902.

Even if the output of the low-pass filter 28 is fed back to the amplitude adjustment circuit 18a so that the output voltage of the filter circuit 23 is zero, the output of the differential amplifier 20 is not reduced to zero, and an AC waveform component remains in a 90 degree-shifted phase. Accordingly, the output of the phase detecting circuit 26 is fed back to the phase adjustment circuit 17a through the low-pass filter 27, whereby the signal of the component, $\phi$=−90, is at 0V.

By feeding back the signals of $\phi$=0 and $\phi$=−90 through the low-frequency filters in this manner, a very low signal change, such as a temperature drift, can be canceled so that only early-period signals can be detected. In detecting a small signal, this operation cancels drift-derived signals so that only early-period signals can be amplified selectively. Thus, the differential amplifier 20 can be operated with a high amplification factor without having its output saturated.

The following is a description of a magnetic material detecting apparatus according to a second embodiment of this invention.

Figure 7:
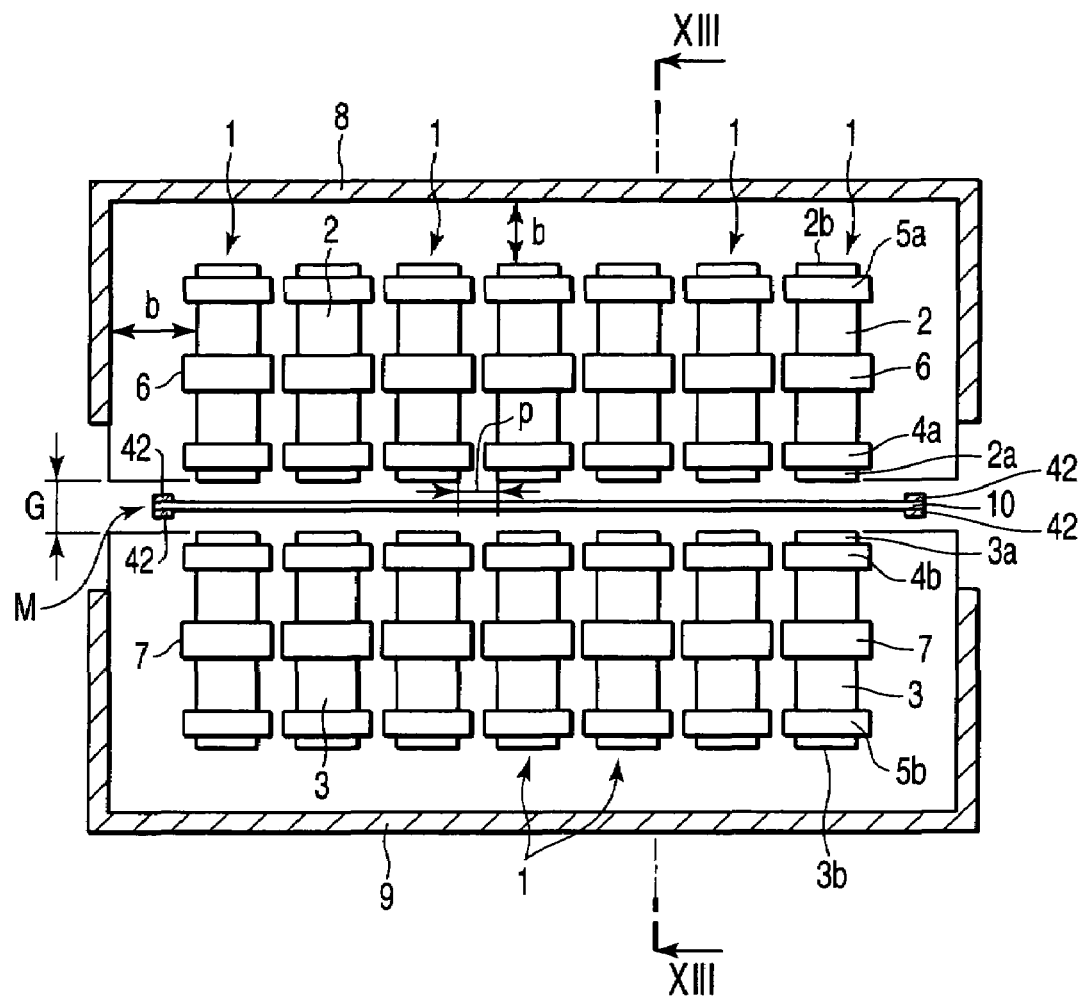
FIG. 7 is a front view, partially in section, typically showing a configuration of a magnetic material detecting apparatus according to a second embodiment of the invention.
Figure 8:
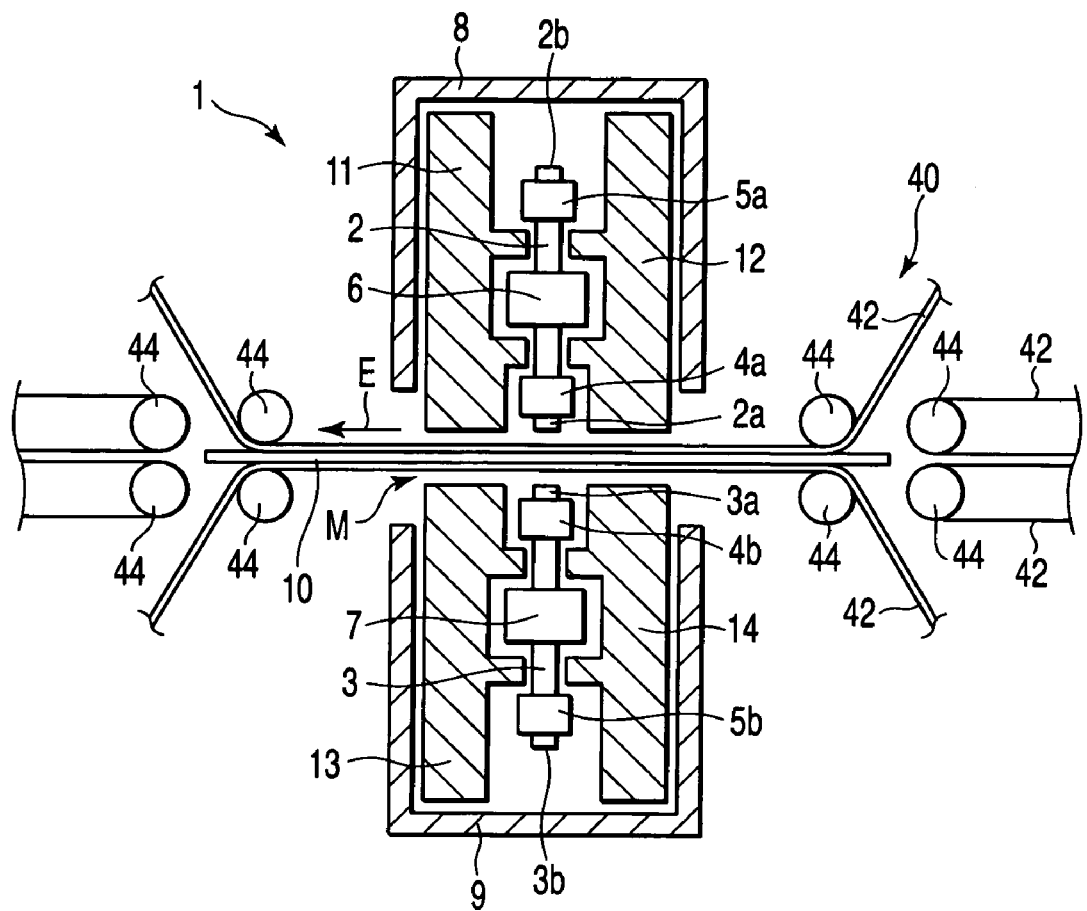
FIG. 8 is a sectional view of the magnetic material detecting apparatus taken along line VIII—VIII of FIG. 7.

As shown in FIGS. 7 and 8, the magnetic material detecting apparatus according to the present embodiment comprises a plurality of, e.g., seven, sensing elements 1 similar to the one shown in FIG. 1, which are arranged side by side. Each sensing element 1 includes a pair of cores 2 and 3. The sensing elements 1 are arranged in the width direction of a sheet 10 so that lines that connect first end portions 2a and 3a of their respective cores 2 and 3 extend parallel to one another. Each sensing element 1 is constructed in the same manner as the one according to the foregoing embodiment. Therefore, like reference numerals are used to designate like portions of the sensing elements, and a repeated description of those portions is omitted.

A magnetic cover 8 is located so as to surround coils 5a and 6 that are wound on the seven cores 2. A magnetic cover 9 is located so as to surround coils 5b and 7 that are wound on the seven cores 2. Supports 11, 12, 13 and 14 for supporting the cores are arranged between the cores 2 and 3 and the magnetic covers 8 and 9. These supports are formed of a nonmagnetic material. The supports 11 to 14 each have a plurality of protrusions, which support the cores 2 and 3 by holding them from both sides. The protrusions of the supports 11 to 14 and the cores 2 and 3 may be fixed with a resin or the like that are filled into spaces between them.

Preferably, spaces between the adjacent sensing elements 1, especially a space p between each two adjacent cores 2 and a space p between each two adjacent cores 3, should be set to be equal to or wider than a gap G between the first end portions 2a and 3a of the cores 2 and 3, in order to reduce interference between the adjacent sensing elements 1.

The magnetic material detecting apparatus comprises a shire conveyor mechanism 40, which conveys the sheet 10 through the gap G between the cores 2 and 3. The conveyor mechanism 40 has conveyor belts 42, conveyor pulleys 44, a drive unit (not shown) for driving the pulleys, etc. The conveyor belts 42 are so as to nip the transversely opposite end portions of the sheet 10 from both sides.

Figure 9:
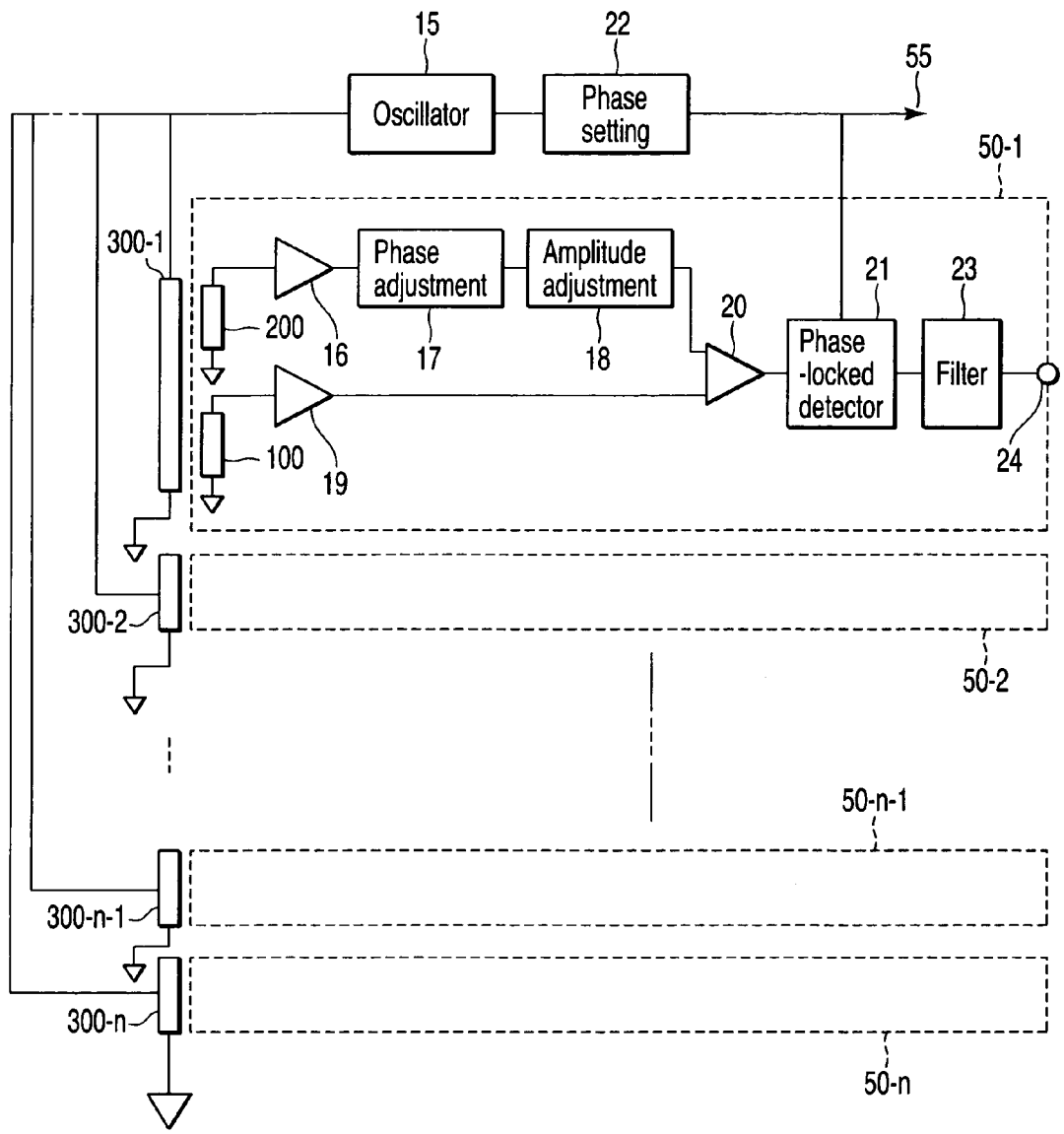
FIG. 9 is a block diagram schematically showing a signal processing circuit of the magnetic material detecting apparatus of the second embodiment.

As shown in FIG. 9, the magnetic material detecting apparatus has n number of third coils 300-1, 300-2, . . . , 300-$n$−1 and 300-$n$, which are formed by series-connecting the coils 6 and 7 that are wound on n pairs of cores. These third coils are connected in parallel with one another. A signal processing circuit of the detecting apparatus energizes the parallel-connected third coils 300-1, 300-2, . . . , 300-$n$−1 and 300-$n$. The signal processing circuit is provided with n number of circuit elements 50-1, 50-2, . . . , 50-$n$−1 and 50-$n$ that are arranged corresponding to the n pairs of cores. Each circuit element is constructed in the same manner as a circuit element 50 of the signal processing circuit of FIG. 3, which is represented by a full enclosure line. The signal processing circuit comprises an oscillator circuit 15 that generates a signal for energizing the third coils 300. The third coils 300-1, 300-2, ..., **300-*n*-1 and 300-*n* are connected in parallel with the oscillator circuit 15. Further, the circuit 15 is connected to a phase setting circuit 22, which serves as a second adjusting unit. An output 55 of the phase setting circuit 22 is connected to respective phase-sensitive detecting circuits 21 of the circuit elements 50-1, 50-2, ..., 50-*n*-1 and 50-*n***. With this arrangement, a detection signal can be obtained for each pair of cores.

According to the second embodiment described above, a magnetic material can be detected substantially covering the whole surface of the sheet 10 with respect to its width direction (perpendicular to the movement direction E), and the site of detection can be specified. Further, a plurality of pairs of cores are arranged side by side, and the third coils are connected in parallel with one another and AC-energized, so that magnetic fields that are generated by the cores are in the same phase. If a plurality of sensing elements 1 are located close to one another, therefore, the adjacent cores interfere little with one another. Thus, detection signals that are induced in first and second coils 100 and 200 of the cores are also influenced little by the interference between the adjacent cores, so that the magnetic material detection can be performed with high accuracy. In consequence, the magnetic material detecting apparatus can be reduced in overall size. Since the third coils are connected in parallel with each other, moreover, drive voltage for the third coils can be lowered provided that the current capacity is fixed.

Although the third coils are connected to the oscillator circuit 15 in parallel relation to one another according to the second embodiment, this invention is not limited to this arrangement. In a signal processing circuit of a magnetic material detecting apparatus according to a third embodiment shown in FIG. 10, n number of third coils 300-1, 300-2, ..., **300-*n*-1 and 300-*n* are connected in series with one another and energized by signals from an oscillator circuit 15**.

Also in the third embodiment, the influence of interference between adjacent cores is so small that magnetic material detection can be performed with high accuracy. In consequence, the magnetic material detecting apparatus can be reduced in overall size.

The following is a description of a magnetic material detecting apparatus according to a fourth embodiment of this invention.

Figure 11:
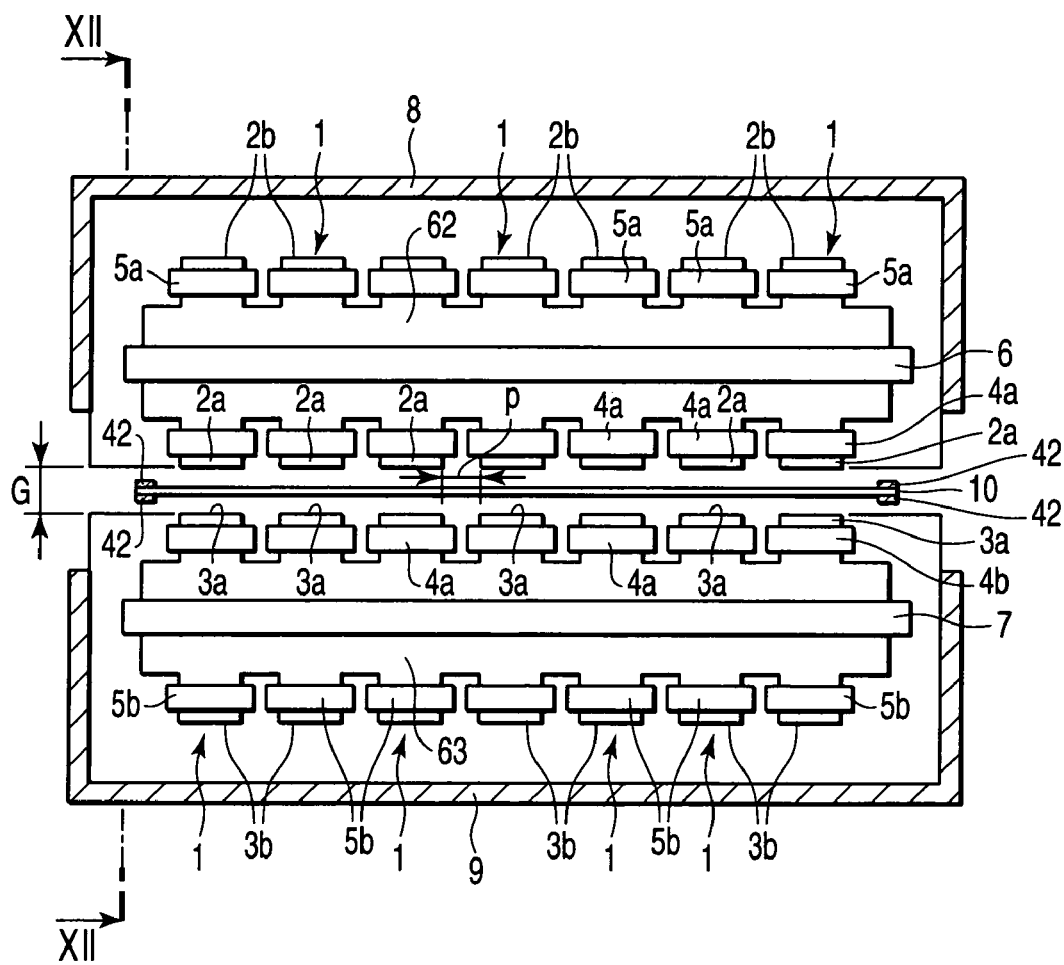
FIG. 11 is a front view, partially in section, typically showing a configuration of a magnetic material detecting apparatus according to a fourth embodiment of the invention.
Figure 12:
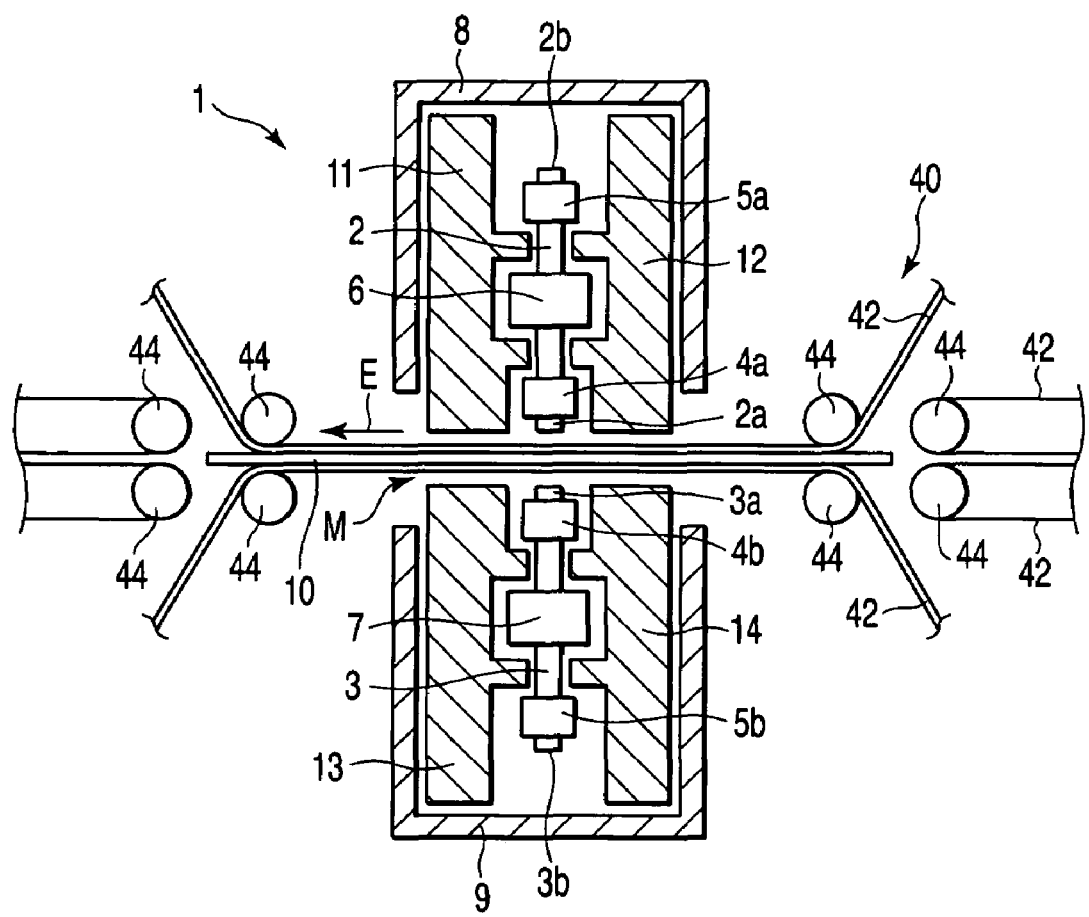
FIG. 12 is a sectional view of the magnetic material detecting apparatus taken along line XII—XII of FIG. 11.

According to the magnetic material detecting apparatus of this invention, as shown in FIGS. 11 and 12, a plurality of sensing elements 1 are formed of a common core. More specifically, the detecting apparatus comprises two cores 62 and 63 in the form of an elongated rectangular plate each. Each core has a length substantially equal to the width of a sheet 10 as a medium to be detected. The two cores 62 and 63 are arranged so that their respective long sides extend parallel to the surface of the sheet 10 and are opposed to each other with a transfer path for the sheet between them.

A plurality of first protrusions are formed integrally on that long side portion of the core 62 which is situated on the transfer path side and constitute first end portions **2*a* of the core, individually. The first end portions 2*a* are arranged at given spaces in the longitudinal direction of the core 62. A plurality of second protrusions are formed integrally on the opposite long side portion of the core 62 and constitute second end portions 2*b*, individually. The second end portions 2*b* are arranged at given spaces in the longitudinal direction of the core 62 and aligned with the first end portions 2*a***, individually.

Likewise, a plurality of protrusions are formed integrally on that long side portion of the core 63 which is situated on the transfer path side and constitute first end portions **3*a*, individually. The first end portions 3*a* are arranged at given spaces in the longitudinal direction of the core 63. Further, the first end portions 3*a* face their corresponding first end portions 2*a* of the core 62 with a gap G between them. A plurality of protrusions are formed integrally on the opposite long side portion of the core 63 and constitute second end portions 3*b*, individually. The second end portions 3*b* are arranged at given spaces in the longitudinal direction of the core 63 and aligned with the first end portions 3*a***, individually.

Coils **4*a* are wound individually on the first end portions 2*a* of the core 62, and coils 5*a* on the second end portions 2*b*. A common coil 6 is wound on an intermediate portion of the core 62 and situated between the coils 4*a* and 5*a*. Coils 4*b* are wound individually on the first end portions 3*a* of the core 63, and coils 5*b* on the second end portions 3*b*. A common coil 7 is wound on an intermediate portion of the core 63 and situated between the coils 4*b* and 5*b***.

Preferably, a space p between each two adjacent first end portions **2*a* and a space p between each two adjacent first end portions 3*a* should be set to be equal to or wider than the gap G between the first end portions 2*a* and 3*a*, in order to reduce interference between the adjacent sensing elements 1**.

As shown in FIGS. 11 and 12, a magnetic cover 8 is located so as to surround the coils **5*a* and 6. A magnetic cover 9 is located so as to surround the coils 5*b* and 7. Supports 11, 12, 13 and 14 for supporting the cores are arranged between the cores 62 and 63 and the magnetic covers 8 and 9. These supports are formed of a nonmagnetic material. The supports 11 to 14 each have a plurality of protrusions, which support the cores 62 and 63 by holding them from both sides. The protrusions of the supports 11 to 14 and the cores 62 and 63** may be fixed with a resin or the like that are filled into spaces between them.

Each sensing element is constructed in the same manner as the ones according to the foregoing embodiments. Therefore, like reference numerals are used to designate like portions of the sensing elements, and a repeated description of those portions is omitted.

Figure 13:
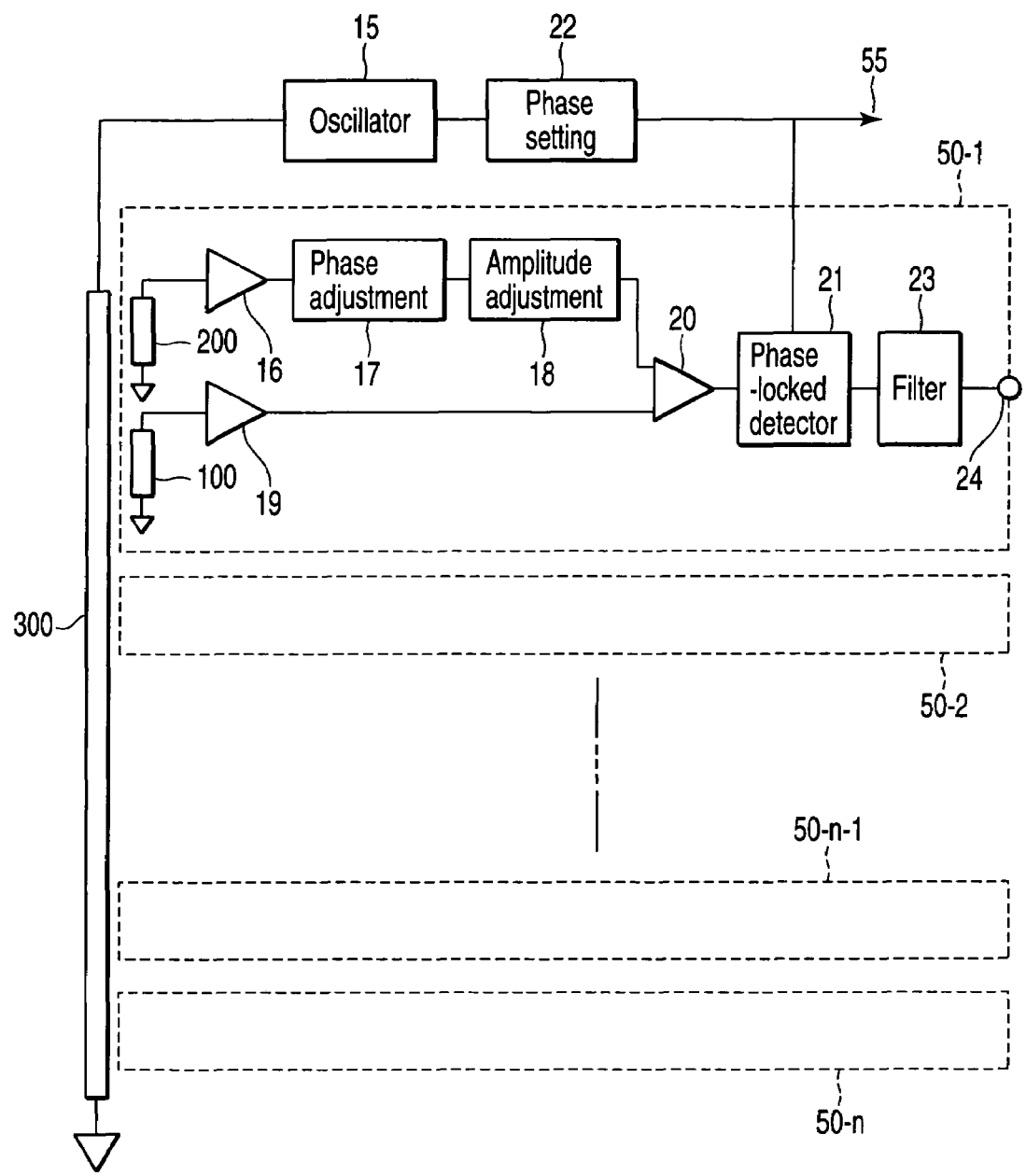
FIG. 13 is a block diagram schematically showing a signal processing circuit of the magnetic material detecting apparatus of the fourth embodiment.

As shown in FIG. 13, a signal processing circuit of the magnetic material detecting apparatus AC-energizes a common third coil 300 that is formed by series-connecting the two coils 6 and 7. The signal processing circuit is provided with n number of circuit elements 50-1, 50-2, ..., **50-*n*-1 and 50-*n* that are arranged corresponding to the sensing elements 1. Each circuit element is constructed in the same manner as the circuit element 50 of the enclosed signal processing circuit of FIG. 3. The signal processing circuit comprises an oscillator circuit 15 that generates a signal for energizing the third coil 300. The oscillator circuit 15 is connected to the third coil 300 and also to a phase setting circuit 22. An output 55 of the phase setting circuit 22 is connected to respective phase-sensitive detecting circuits 21 of the circuit elements 50-1, 50-2, ..., 50-*n*-1 and 50-*n*. With this arrangement, a detection signal can be obtained for each sensing element 1**.

According to the fourth embodiment arranged in this manner, the same effects of the foregoing second embodiment can be obtained. According to the fourth embodiment, moreover, the sensing elements are formed using the common cores 62 and 63 and the common coils 6 and 7, so that the detecting apparatus can be assembled with ease, and the gap G between the first end portions 2a and 3a of the cores can be adjusted at a time for the plurality of sensing elements.

The present invention is not limited directly to the embodiments described above, and its components may be embodied in modified forms without departing from the scope or spirit of the invention. Further, various inventions may be made by suitably combining a plurality of components described in connection with the foregoing embodiments. For example, some of the components according to the foregoing embodiments may be omitted. Furthermore, the components according to the different embodiments may be combined as required.

For example, each of the cores that constitute each sensing element is not limited to the shape of a plate, and may be formed having any other shape, such as the shape of a rod. Further, the medium to be detected is not limited to a sheet and may alternatively be a Belt-shaped film or any other medium that is coated with or contains a magnetic material.

What is claimed is:

1. A magnetic material detecting apparatus for detecting a magnetic material contained in a medium to be detected, comprising:
   a pair of cores, each of which has a first end portion, a second end portion opposite to the first end portion, and an intermediate portion between the first and second end portions, the respective first end portions of the cores being opposed to each other across a gap with a transfer path for the passage of the medium to be detected therebetween;
   a first coil including coils which are wound individually on the respective first end portions of the cores and connected in series with each other;
   a second coil including coils which are wound individually on the respective second end portions of the cores and connected in series with each other;
   a third coil including coils which are wound individually on the respective intermediate portions of the cores and connected in series with each other; and
   a signal processing circuit which AC-energizes the third coil to process a detection signal from the first coil and a detection signal from the second coil.

2. A magnetic material detecting apparatus according to claim 1, which further comprises magnetic covers of a magnetic material which individually surround the respective second end portions of the paired cores.

3. A magnetic material detecting apparatus according to claim 1, wherein each of the cores is formed by laminating amorphous foils together.

4. A magnetic material detecting apparatus according to claim 2, wherein a gap between the cores and the magnetic covers is wider than a gap between the first and second end portions of the cores.

5. A magnetic material detecting apparatus according to claim 2, wherein each of the magnetic covers has an open end which opens on the transfer path side, and a gap between the first end portion of each core and the open end of the magnetic cover is wider than a gap between the respective first end portions of the paired cores.

6. A magnetic material detecting apparatus according to claim 1, wherein the signal processing circuit comprises a first adjustment circuit which adjusts the phase and amplitude of the detection signal from the first or second coil, a unit which obtains a difference signal in accordance with the phase and amplitude of the detection signal from the second or first coil, a second adjustment circuit which adjusts the phase of an AC signal which energizes the third coil, and a smoothing unit which detects and smoothes the phase of the difference signal with use of an output of the second adjustment circuit as a reference waveform.

7. A magnetic material detecting apparatus according to claim 6, wherein the signal processing circuit comprises a first phase setting circuit adjusted to a phase which maximizes a magnetic material detection signal from the difference signal, a second phase setting circuit adjusted to a phase which is shifted at 90 degrees to the phase which maximizes the magnetic material detection signal, a first adjusting unit which adjusts the amplitude of the first or second detection signal in response to an output signal from the first phase setting circuit, and a second adjusting unit which adjusts the phase of the first or second detection signal in response to an output signal from the second phase setting circuit.

8. A magnetic material detecting apparatus for detecting a magnetic material contained in a medium to be detected, comprising:
   a plurality of sensing elements arranged side by side; and
   magnetic covers of a magnetic material which individually surround at least parts of the sensing elements exclusive of a transfer path along which the medium to be detected is conveyed;
   each of the sensing elements including:
   a pair of cores, each of which has a first end portion, a second end portion opposite to the first end portion, and an intermediate portion between the first and second end portions, the respective first end portions of the cores being opposed to each other across a gap with a transfer path for the passage of the medium to be detected therebetween,
   a first coil including coils which are wound individually on the respective first end portions of the cores and connected in series with each other,
   a second coil including coils which are wound individually on the respective second end portions of the cores and connected in series with each other,
   a third coil including coils which are wound individually on the respective intermediate portions of the cores and connected in series with each other, and
   a signal processing circuit which AC-energizes the third coil to process a detection signal from the first coil and a detection signal from the second coil,
   the sensing elements being arranged side by side so that lines connecting the respective first end portions of the paired cores of the sensing elements are parallel to one another.

9. A magnetic material detecting apparatus according to claim 8, wherein the respective third coils of the sensing elements are connected in series with one another.

10. A magnetic material detecting apparatus according to claim 8, wherein the respective third coils of the sensing elements are connected in parallel with one another.

11. A magnetic material detecting apparatus according to claim 8, wherein the signal processing circuit comprises a plurality of circuit elements provided individually for the first and second coils of the sensing elements, each of the circuit elements including a first adjustment circuit which adjusts the phase and amplitude of the detection signal from the first or second coil, a unit which obtains a difference signal in accordance with the phase and amplitude of the detection signal from the second or first coil, a second adjustment circuit which adjusts the phase of an AC signal which energizes the third coil, and a smoothing unit which detects and smoothes the phase of the difference signal with use of an output of the second adjustment circuit as a reference waveform.

12. A magnetic material detecting apparatus for detecting a magnetic material contained in a medium to be detected, comprising:
- a pair of platelike cores each having a pair of long side portions opposite to each other, an intermediate portion situated between the long side portions, a plurality of first protrusions arranged spaced from one another on one of the long side portions, and a plurality of second protrusions arranged spaced from one another on the other long side portion, the paired cores being arranged so that the first protrusions of one of the cores and the first protrusions of the other core are opposed to one another across a given gap with a transfer path for the passage of the medium to be detected therebetween;
- a plurality of first coils each including a plurality of coils which are wound individually on the opposite first protrusions of each set on the paired cores and connected in series for each set;
- a plurality of second coils each including a plurality of coils which are wound individually on the second protrusions of each set on the paired cores and connected in series for each set;
- a third coil including two coils which are wound individually on the respective intermediate portions of the paired cores;
- a pair of magnetic covers of a magnetic material which individually surround the respective second-protrusion-side long side portions of the cores; and
- a signal processing circuit which AC-energizes the third coil to process a plurality of detection signals from the first coils and a plurality of detection signals from the second coils.

13. A magnetic material detecting apparatus according to claim 12, wherein the signal processing circuit comprises a plurality of circuit elements provided individually for the sets of first and second coils, each of the circuit elements including a first adjustment circuit which adjusts the phase and amplitude of the detection signal from the first or second coil, a unit which obtains a difference signal in accordance with the phase and amplitude of the detection signal from the second or first coil, a second adjustment circuit which adjusts the phase of an AC signal which energizes the third coil, and a smoothing unit which detects and smoothes the phase of the difference signal with use of an output of the second adjustment circuit as a reference waveform.

* * * * *